June 7, 1927. 1,631,341
H. C. SCHAPER
PERSONAL WEIGHING SCALE
Filed May 19, 1925  2 Sheets-Sheet 1
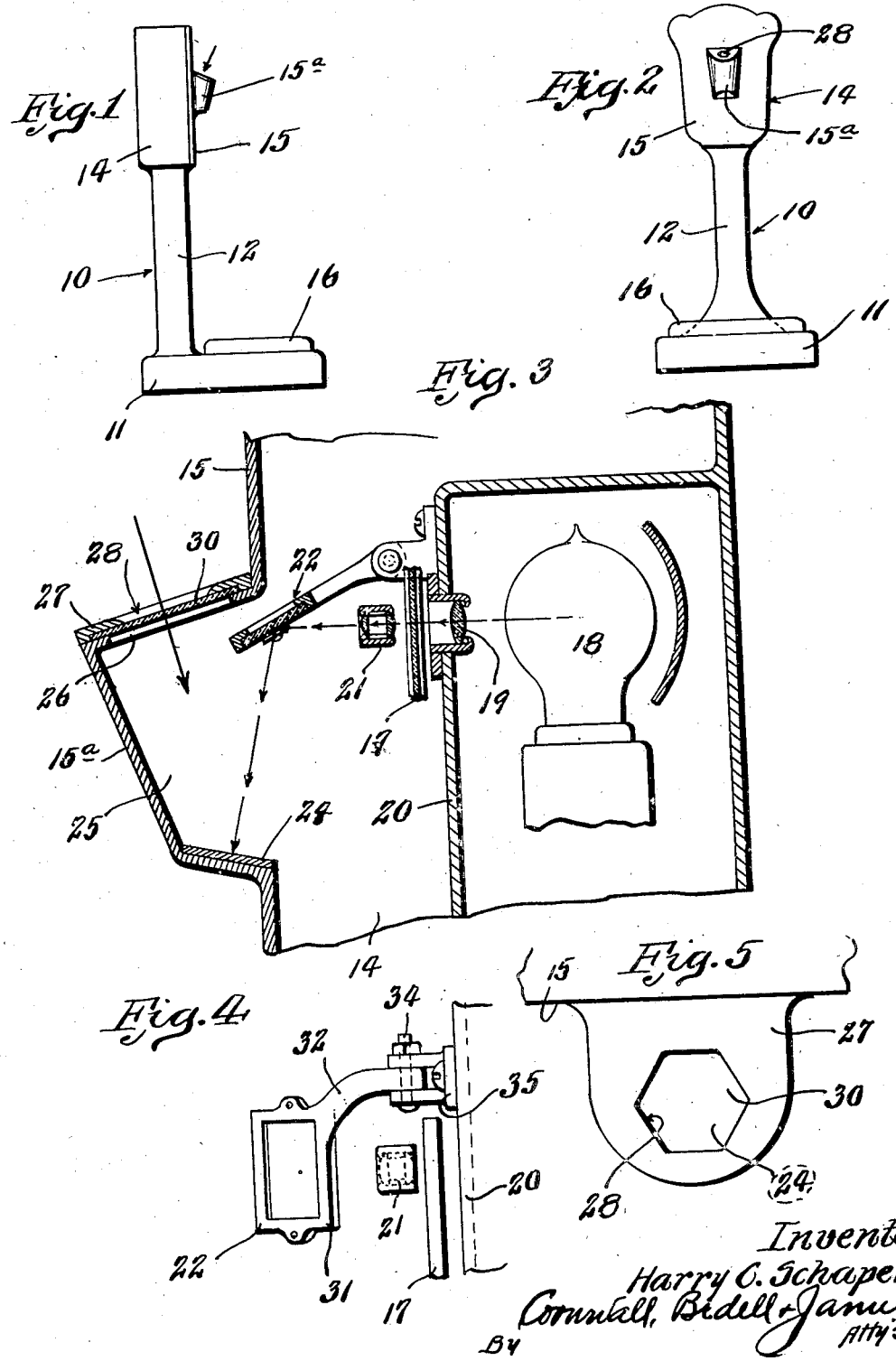
Inventor
Harry C. Schaper
Cornwall, Bidell & Janus
By Attys.

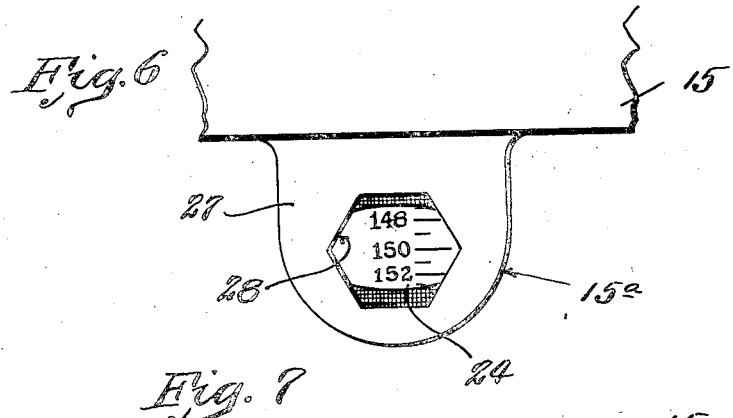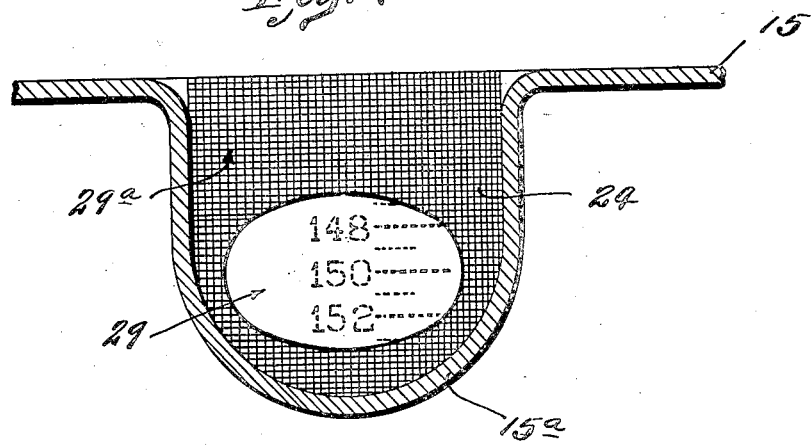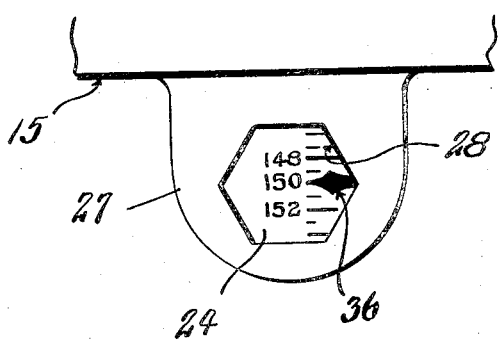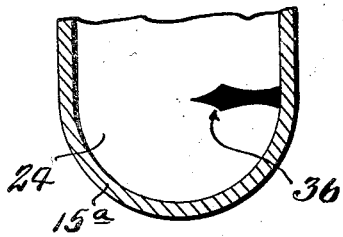

Patented June 7, 1927.

1,631,341

UNITED STATES PATENT OFFICE.

HARRY C. SCHAPER, OF ST. LOUIS, MISSOURI, ASSIGNOR TO THE WEIGHTOGRAPH COMPANY, OF ST. LOUIS, MISSOURI, A CORPORATION OF MISSOURI.

PERSONAL WEIGHING SCALE.

Application filed May 19, 1925. Serial No. 31,379.

This invention relates to new and useful improvements in personal weighing scales and especially to the system or reading arrangement thereof.

In the personal weighing scales now generally used, the dial is so arranged that bystanders can easily read the dial and ascertain the weight of the person who is being weighed. This is embarrassing to many persons who are sensitive about their weight and do not wish to have their weight known by others.

It is the object of the present invention to arrange the sight opening of the scale so that only the person standing on the weighing platform of said scale can read the weight indicating marks. My invention is particularly adapted to be used in conjunction with a scale of the type disclosed in my U. S. Patent #1,357,731, dated November 2, 1920, wherein the weighing marks are projected from a transparent chart member onto a screen.

With these and other objects in view, my invention consists in certain novel features of construction and arrangement of parts, hereinafter more fully described and claimed, and illustrated in the accompanying drawings, in which—

Figure 1 is a side elevational view of a personal weighing scale of my improved construction.

Figure 2 is a front elevational view.

Figure 3 is a vertical cross section showing the projecting and reading arrangement thereof.

Figure 4 is a top plan view of the reflecting member and its support.

Figure 5 is an enlarged view of the sight opening of the scale.

Figure 6 is a similar view but showing the projected weight indicia.

Figure 7 is an enlarged plan view of the screen with the weight indicia indicated in dotted lines.

Figure 8 is a view similar to Figure 6 and showing modified means for selecting the weight indicia mark.

Figure 9 is a horizontal section through the semi-cylindrical sight chamber and showing the modified form of screen.

Referring by numerals to the accompanying drawings, 10 indicates a personal weighing scale having a base 11 from which extends upwardly a hollow column 12 carrying a housing 14, the front end of which is closed by a removable cover plate 15. A weighing platform 16 is movably supported in base 11 and is operatively connected to a suitable weighing mechanism which is arranged in housing 14. This weighing mechanism is similar in construction and operation to the weighing mechanism shown and described in a copending application filed by me October 13, 1921, Serial No. 507,492 and is not shown or described in the present application.

A chart member 17 which is actuated by said weighing mechanism in accordance with the load placed on the weighing platform 16, is provided with suitable weight indicating marks which are projected by suitable projecting means comprising a source of light 18 and a condensing lens 19 which are arranged in a suitable housing 20 formed in housing 14 and by means of projecting lenses 21 disposed exteriorly of housing 20 in optical axis with condensing lens 19. Chart member 15 is mounted so as to operate between said lenses 19 and 21 whereby the weight indicia is projected forwardly in a magnified form by projecting lenses 21.

A reflecting member 22 is arranged in the path of the projected image and is spaced a suitable distance from lenses 21 for deflecting the image downwardly onto a screen 24 made of opaque white material and located in the bottom of a vertically disposed compartment 25 formed on the front cover plate 15 by an outwardly presented cylindrical wall 15ª which is preferably formed integral with cover 15. This wall 15ª is preferably disposed at an angle to plate 15, thereby forming at the top a comparatively large opening 26 which is adapted to receive a cover 27 having a sight opening 28, preferably hexagonal in shape, as shown in Figure 5, through which the weight indicia projected onto the screen 24 can be read.

In order to enable the correct reading of the projected weight indicia, the screen member 24 has a white space portion 29 which is of proper dimensions to accommodate the projected images of three weight indicia, said white space being bounded by a black space portion 29ª which eliminates all other projected images as shown in Figure 6. There being three weight indicia projected on the white ground, the central indicia is always selected as indicating correct weight. If desired, instead of using a separate screen 24, the bottom wall of the pocket 25 can be appropriately painted and used as a screen. If desired, the cover 27 can be provided with a clear pane of glass 30 for closing the sight opening 28 in order to exclude dirt and dust from the interior of the scale.

The reflecting member 22 is mounted in a frame 31 formed integral with which is a lug 32 provided with an aperture for receiving a pin or bolt 34 which is carried in lugs formed on a bracket 35 and provides a pivotal mounting for frame 31 and reflecting member 22 so that the latter can be angularly adjusted relative to the optical axis of the projecting means and to the opaque screen 24.

Bracket 35 can be fixed to any suitable portion of the housing, in the present instance being shown attached to one of the walls of inner housing 20. The bulging wall 15ª forming recess or well 25 is located a suitable distance above the weighing platform so that the person standing on the weighing platform can look down into said recess and conveniently read the projected weight indicia.

In Figures 8 and 9, a modified form is shown wherein a mark or pointer 36 is placed on the screen 24 or adjacent thereto for pointing out the proper weight indicia.

In the operation of the scale, when a person steps on the weighing platform, the weighing mechanism is thereby actuated and moves the chart member 17 so as to position the proper weight indicia in the optical axis of the projecting means. The weight indicia so positioned is projected by the projecting means against the downwardly presented reflecting member 22 which then deflects the reflected image downwardly onto the screen 34 as indicated by arrows in Figure 3. The screen 24 being located in the bottom of the downwardly presented recess 25, it is obvious that only the person standing on the weighing platform can read the weight indicia.

I claim:

1. In a scale the combination with a housing, of weighing mechanism located within the housing including a transparent weight indicia member, a platform located exteriorly of the housing and connected with said weighing mechanism, an extension connected with the housing having a sight opening lying in substantially a horizontal plane and in view of an operator on the weighing platform, projecting means for projecting the scale indicia, a screen located within the extension and out of view except through said sight opening, and a reflector for reflecting the scale indicia image on to said screen.

2. In a scale the combination with a housing, of weighing mechanism located within the housing including a transparent weight indicia member, a platform located exteriorly of the housing and connected with said weighing mechanism, an extension connected with the housing having a sight opening lying in substantially a horizontal plane and in view of an operator on the weighing platform, projecting means for projecting the scale indicia, a screen located within the extension and out of view except through said sight opening, a reflector for reflecting the scale indicia image on to said screen, and means for adjusting said reflector to center the image on said screen.

In testimony whereof I hereunto affix my signature this 17th day of April, 1925.

HARRY C. SCHAPER.